United States Patent
Bran De Leon et al.

(10) Patent No.: US 9,116,310 B2
(45) Date of Patent: Aug. 25, 2015

(54) FIBER OPTIC CABLE PASS-THRU FITTING WITH A CABLE RETENTION MEMBER FOR ROUTING STRENGTH MEMBERS

(75) Inventors: Oscar Fernando Bran De Leon, Belle Plaine, MN (US); James Solheid, Lakeville, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 840 days.

(21) Appl. No.: 13/254,707

(22) PCT Filed: Mar. 4, 2010

(86) PCT No.: PCT/US2010/026156
§ 371 (c)(1),
(2), (4) Date: Dec. 6, 2011

(87) PCT Pub. No.: WO2010/102081
PCT Pub. Date: Sep. 10, 2010

(65) Prior Publication Data
US 2012/0087628 A1    Apr. 12, 2012

Related U.S. Application Data

(60) Provisional application No. 61/158,212, filed on Mar. 6, 2009.

(51) Int. Cl.
*G02B 6/38* (2006.01)
*G02B 6/44* (2006.01)
*G02B 6/42* (2006.01)

(52) U.S. Cl.
CPC ............ *G02B 6/3887* (2013.01); *G02B 6/4478* (2013.01); *G02B 6/4248* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 4,447,120 A * | 5/1984 | Borsuk | 385/136 |
| 4,715,251 A | 12/1987 | Margolin et al. | |
| 4,770,491 A * | 9/1988 | Champa et al. | 385/136 |
| 4,842,364 A * | 6/1989 | Chen | 385/136 |

(Continued)

FOREIGN PATENT DOCUMENTS

| | | |
|---|---|---|
| EP | 0 130 513 A2 | 1/1985 |
| JP | 57-048706 | 3/1982 |
| WO | WO 2005/006049 | 1/2005 |

OTHER PUBLICATIONS

International Search Report and Written Opinion in Application PCT/US2010/026156, mailed Aug. 31, 2010, 7pgs.

*Primary Examiner* — Andrew Jordan
(74) *Attorney, Agent, or Firm* — Merchant & Gould P.C.

(57) ABSTRACT

A cable pass-thru assembly includes a fiber optic cable and a cable pass-thru fitting. The fiber optic cable includes an optical fiber and a strength member. The cable pass-thru fitting is adapted to receive at least a portion of the fiber optic cable. The cable pass-thru fitting includes a fitting assembly having a body defining a thru-bore that extends through the body. The thru-bore includes a tapered portion. The cable pass-thru fitting further includes a cable retention member adapted for engagement with the tapered portion of the body. The cable retention member defines a plurality of through which the strength member of the fiber optic cable is routed. The plurality of grooves is adapted to secure the strength member when the cable retention member is inserted into the thru-bore.

12 Claims, 13 Drawing Sheets

(56) References Cited

U.S. PATENT DOCUMENTS

| | | |
|---|---|---|
| 4,863,235 A | 9/1989 | Anderson et al. |
| 5,013,122 A | 5/1991 | Savitsky et al. |
| 5,166,997 A | 11/1992 | Norland et al. |
| 5,519,921 A * | 5/1996 | Templer, Jr. .................... 24/130 |
| 5,644,673 A * | 7/1997 | Patterson ..................... 385/138 |
| 6,389,214 B1 * | 5/2002 | Smith et al. ................... 385/136 |
| 6,487,343 B1 | 11/2002 | Lewandowski et al. |
| 6,672,894 B2 * | 1/2004 | Sprunger ....................... 439/449 |
| 7,097,486 B2 * | 8/2006 | Parsons ........................ 439/291 |
| 7,146,090 B2 | 12/2006 | Vo et al. |
| 7,751,675 B2 | 7/2010 | Holmberg et al. |
| 8,873,926 B2 * | 10/2014 | Beamon et al. ................ 385/136 |
| 8,915,659 B2 * | 12/2014 | Marcouiller et al. ........... 385/99 |
| 2002/0064364 A1 * | 5/2002 | Battey et al. .................. 385/136 |
| 2006/0172578 A1 * | 8/2006 | Parsons ........................ 439/291 |
| 2007/0127875 A1 | 6/2007 | Allen et al. |
| 2008/0124031 A1 | 5/2008 | Scadden et al. |
| 2009/0238531 A1 | 9/2009 | Holmberg et al. |
| 2010/0189404 A1 | 7/2010 | Rudenick et al. |
| 2010/0290746 A1 | 11/2010 | Bran de Leon et al. |
| 2011/0280525 A1 * | 11/2011 | Marcouiller et al. ........... 385/99 |
| 2012/0051710 A1 * | 3/2012 | Zeng et al. .................... 385/137 |
| 2012/0087628 A1 * | 4/2012 | Bran De Leon et al. ...... 385/136 |
| 2012/0106914 A1 | 5/2012 | Solheid et al. |

* cited by examiner

FIBER OPTIC CABLE PASS-THRU FITTING WITH A CABLE RETENTION MEMBER FOR ROUTING STRENGTH MEMBERS

CROSS-REFERENCE TO RELATED APPLICATIONS

This application is being filed on Mar. 4, 2010, as a PCT International Patent application in the name of ADC Telecommunications, Inc., a U.S. national corporation, applicant for the designation of all countries except the U.S., and Oscar Fernando Bran de Leon, a citizen of the U.S., and James J. Solheid, a citizen of the U.S., applicants for the designation of the U.S. only, and claims priority to U.S. Provisional Patent Application Ser. No. 61/158,212 filed on Mar. 6, 2009.

BACKGROUND

Fiber optic enclosures can be used in fiber optic networks to provide an access location for subscribers to a main fiber optic cable. These fiber optic enclosures typically include connection ports at which fiber optic connectors of a subscriber cable can be engaged to established fiber optic connectivity for a given subscriber location.

In some instances, however, the subscriber cable does not include fiber optic connectors. In some instances, the subscriber cable is spliced to the fiber optic cables within the fiber optic enclosure. Therefore, it is desirable to have a fitting that can mount to the fiber optic enclosure at the connection ports and allow the subscriber cable to pass through the fitting to the interior of the fiber optic enclosure.

SUMMARY

An aspect of the present disclosure relates to a cable pass-thru assembly. The cable pass-thru assembly includes a cable pass-thru fitting that is adapted to secure a portion of a strength member of a fiber optic cable to the cable pass-thru fitting as an optical fiber of the fiber optic cable passes through the cable pass-thru fitting.

An aspect of the present disclosure relates to a cable pass-thru assembly. The cable pass-thru assembly includes a fiber optic cable and a cable pass-thru fitting. The fiber optic cable includes an optical fiber and a strength member. The cable pass-thru fitting is adapted to receive at least a portion of the fiber optic cable. The cable pass-thru fitting includes a fitting assembly having a body defining a thru-bore that extends through the body. The thru-bore includes a tapered portion. The cable pass-thru fitting further includes a cable retention member adapted for engagement with the tapered portion of the body. The cable retention member defines a plurality of through which the strength member of the fiber optic cable is routed. The plurality of grooves is adapted to secure the strength member when the cable retention member is inserted into the thru-bore.

Another aspect of the present disclosure relates to a cable pass-thru assembly. The cable pass-thru assembly includes a fiber optic cable and a cable pass-thru fitting. The fiber optic cable has an optical fiber and a strength member. The cable pass-thru fitting is adapted to receive at least a portion of the fiber optic cable. The cable pass-thru fitting includes a fitting assembly and a cable retention member. The fitting assembly has a body defining a thru-bore that extends through the body. The thru-bore includes a tapered portion. The cable retention member includes a body portion having a plurality of resilient protrusions that is adapted for engagement with the body of the fitting assembly. The strength member of the fiber optic cable is secured between the cable retention member and the body when the cable retention member is inserted into the thru-bore.

Another aspect of the present disclosure relates to a method for installing a fiber optic cable in a cable pass-thru fitting. The method includes providing a cable pass-thru fitting having a fitting assembly and a cable retention assembly. An end of a fiber optic cable is passed through a thru-bore of a body of the fitting assembly and through a bore of the cable retention member. A strength member of the fiber optic cable is routed around a portion of the cable retention member. The cable retention member and the fitting assembly are engaged.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
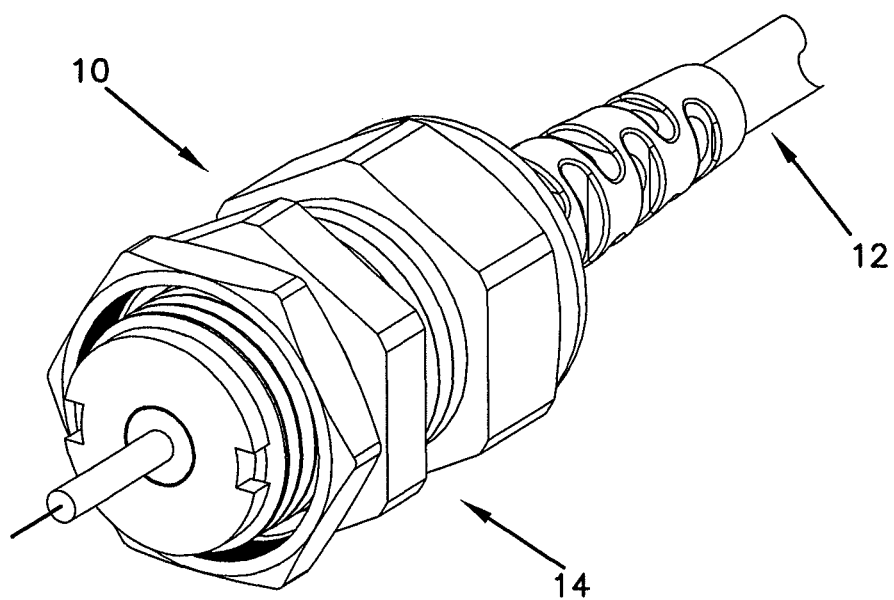
FIG. 1 is a perspective view of a cable pass-thru assembly having exemplary features of aspects in accordance with the principles of the present disclosure.
Figure 2:
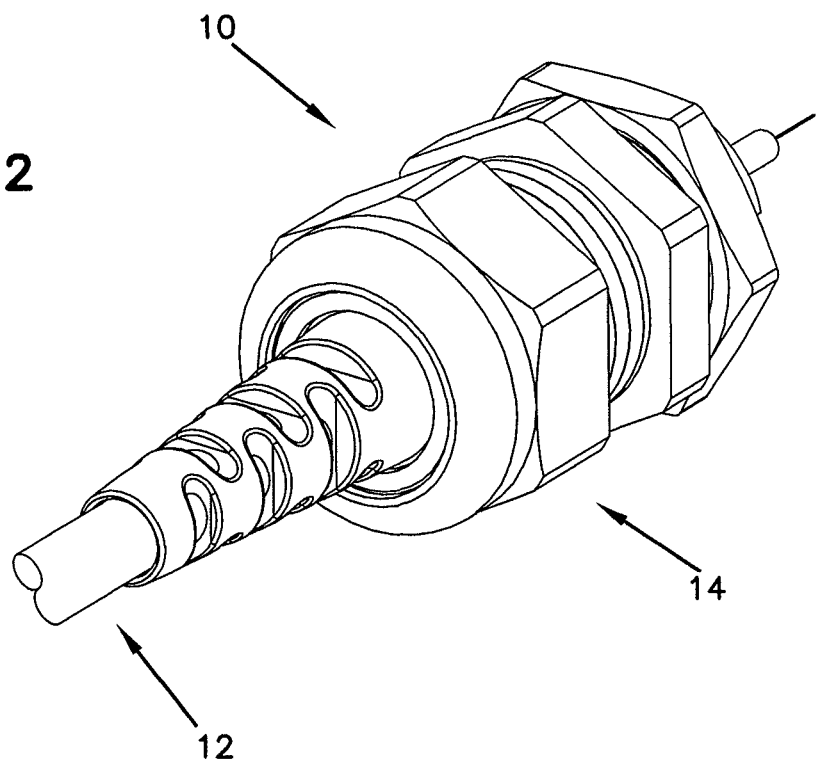
FIG. 2 is a rear perspective view of the cable pass-thru assembly of FIG. 1.

Referring now to FIGS. 1 and 2, a cable pass-thru assembly, generally designated 10, is shown. The cable pass-thru assembly 10 includes a fiber optic cable, generally designated 12, and a cable pass-thru fitting, generally designated 14.

Figure 3:
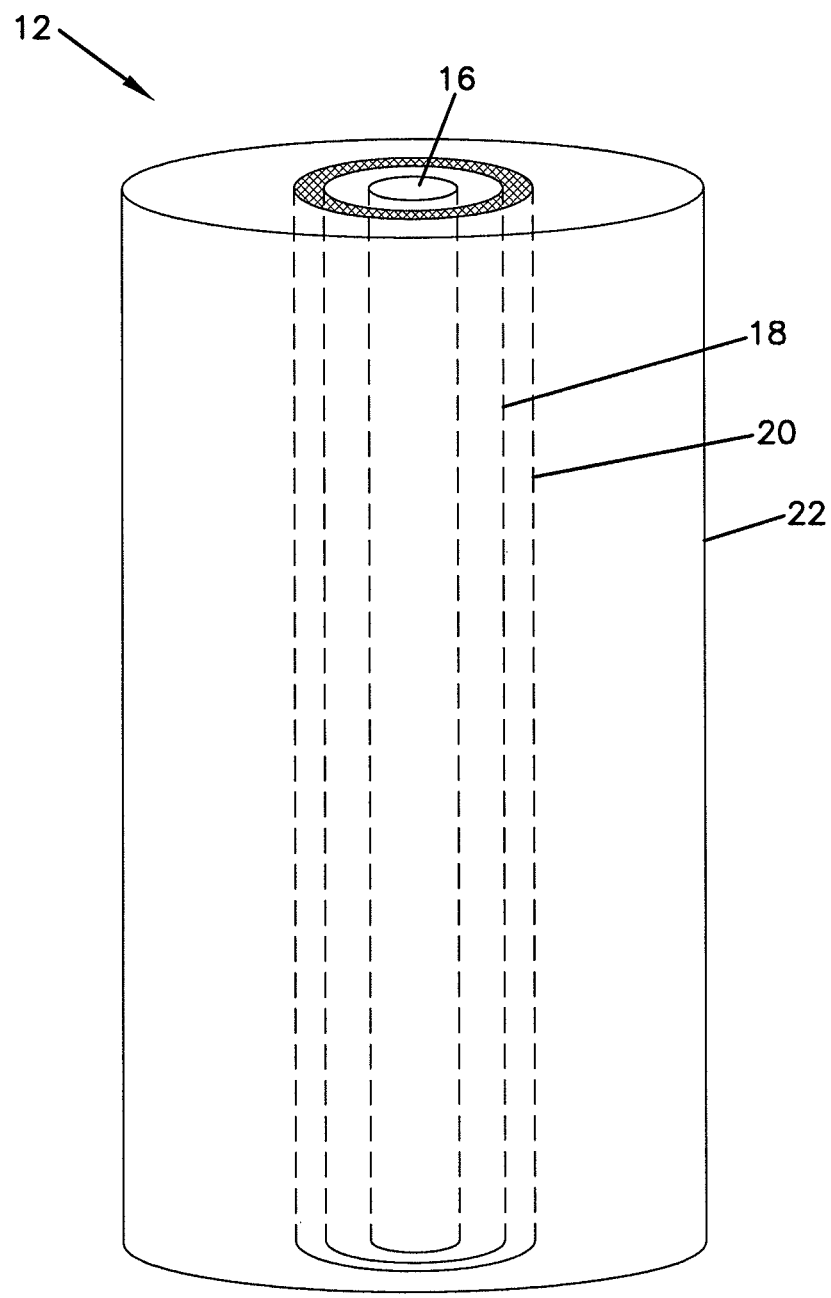
FIG. 3 is a schematic representation of a fiber optic cable suitable for use with the cable pass-thru assembly of FIG. 1.

Referring now to FIG. 3, an exemplary fiber optic cable 12 that is suitable for use with the cable pass-thru fitting 14 is shown. The fiber optic cable 12 includes at least one optical fiber 16, a buffer layer 18 surrounding the optical fiber 16, a strength member 20, and an outer jacket 22.

The strength member 20 is adapted to inhibit axial tensile loading from being applied to the optical fiber 16. In one aspect of the present disclosure, the strength member 20 extends the length of the fiber optic cable 12 and is disposed in a generally longitudinal direction along the fiber optic cable 12 between the buffer layer 18 and the outer jacket 22. The strength layer 20 can include yarns, fibers, threads, tapes, films, epoxies, filaments or other structures. In one aspect of the present disclosure, the strength layer 20 includes a plurality of aramid yarns.

Figure 4:
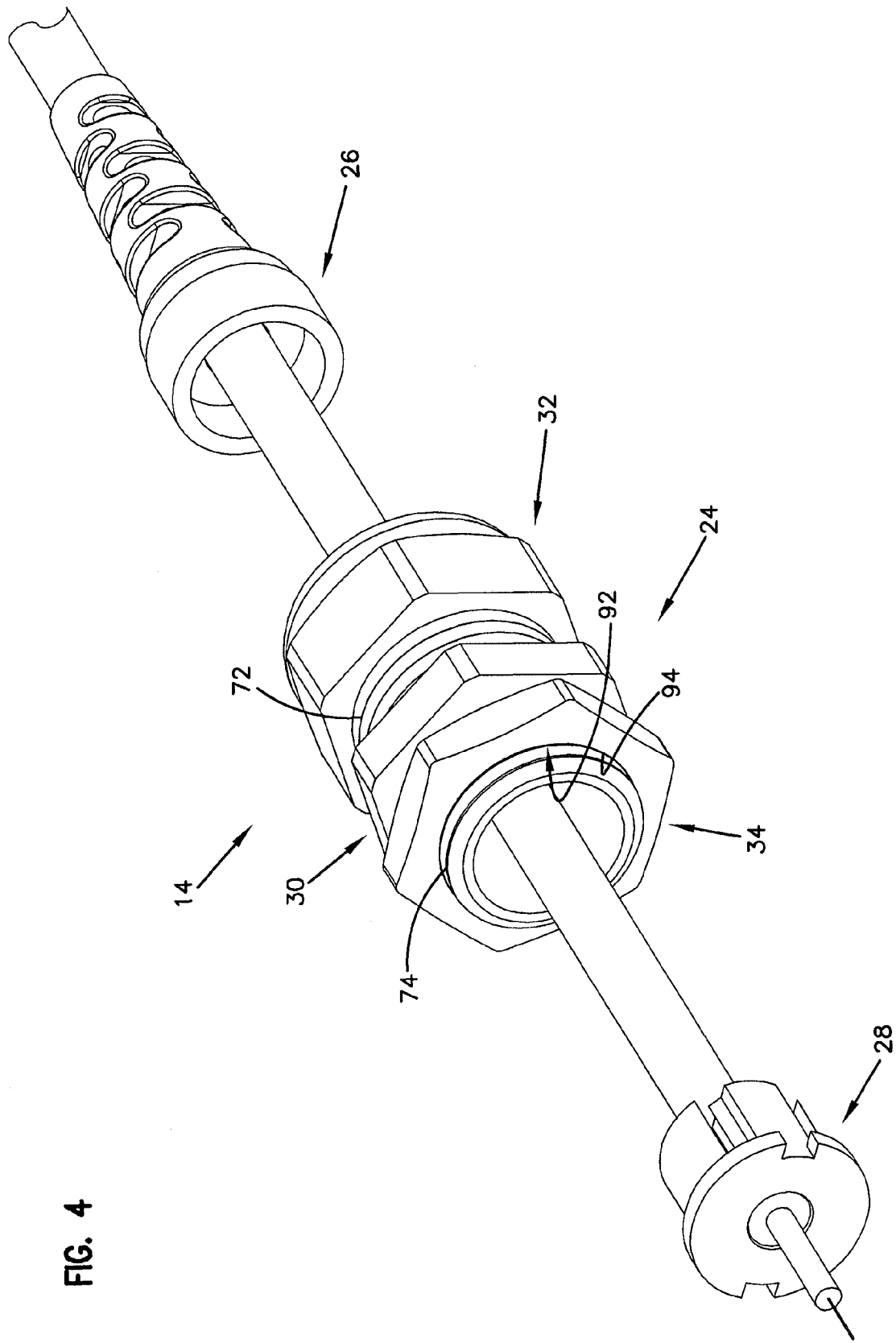
FIG. 4 is an exploded perspective view of the cable pass-thru assembly of FIG. 1.

Referring now to FIG. 4, the cable pass-thru fitting 14 is shown. The cable pass-thru fitting 14 includes a fitting assembly 24, a seal member 26, and a cable retention member 28.

Figure 5:
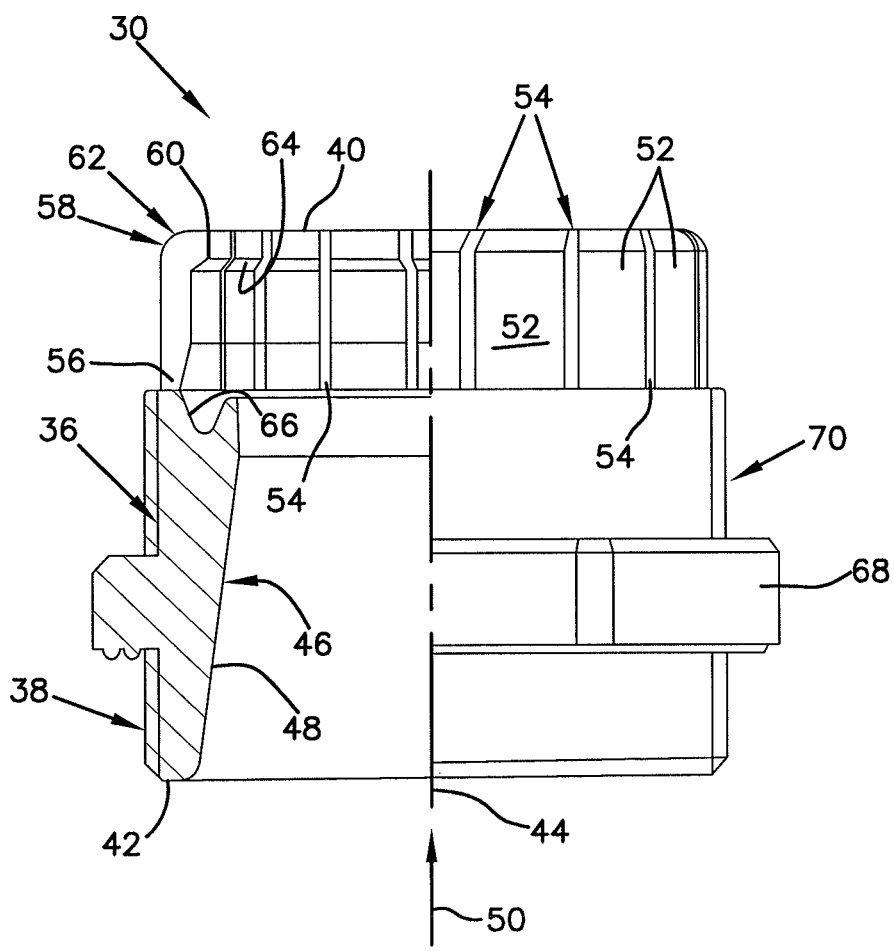
FIG. 5 is a partial cross-sectional view of a body of a cable pass-thru fitting assembly suitable for use with the cable pass-thru assembly of FIG. 1.
Figure 6:
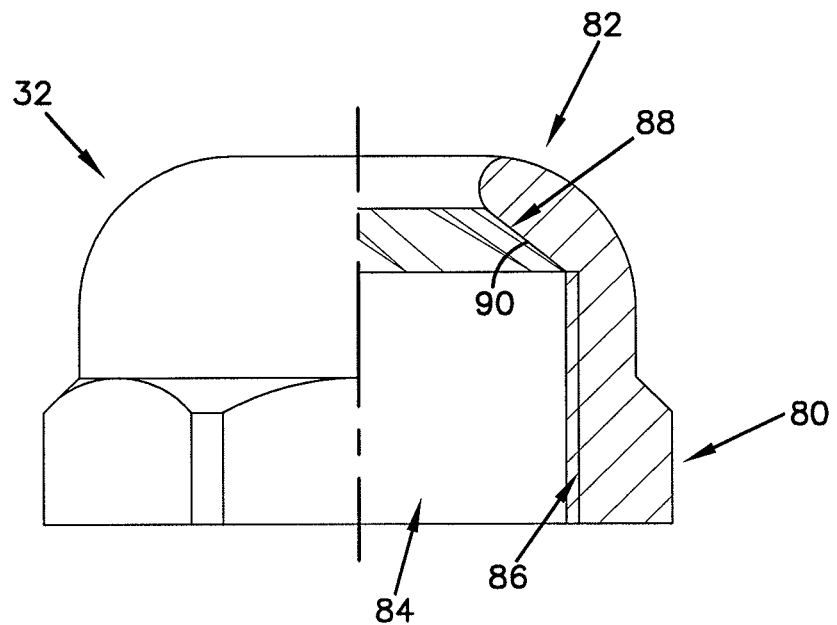
FIG. 6 is a partial cross-sectional view of a cap member of a cable pass-thru fitting assembly suitable for use with the cable pass-thru assembly of FIG. 1.

Referring now to FIGS. 4-6, the fitting assembly 24 of the cable pass-thru fitting 14 is shown. The fitting assembly 24 includes a body 30, a cap member 32, and a retainer member 34.

The body 30 includes a first axial end portion 36 and an oppositely disposed second axial end portion 38. The first axial end portion 36 includes a first end surface 40 while the second axial end portion 38 includes a second end surface 42. In one aspect of the present disclosure, the first and second end surfaces 40, 42 are generally perpendicular to a central longitudinal axis 44 (shown as a dashed line in FIG. 5) of the fitting assembly 24.

The body 30 defines a thru-bore 46 that is adapted to receive the fiber optic cable 12. The thru-bore 46 extends from the first end surface 40 of the first axial end portion 36 of the body 30 to the second end surface 42 of the second axial end portion 38 along the central longitudinal axis 44. The thru-bore 46 includes a tapered portion 48 disposed in the second axial end portion 38. The tapered portion 48 flares outwardly with respect to a cable insertion direction 50 (shown as an arrow in FIG. 5) that is directed from the first axial end portion 36 to the second axial end portion 38.

The first axial end portion 36 of the body 30 includes a plurality of resilient projections 52 that extend in an axial direction and a plurality of slots 54 alternating with the plurality of resilient projections 52. Each of the plurality of resilient projections 52 includes a base end 56 and an oppositely disposed free end 58. The base end 56 is engaged with the first axial end portion 36 of the body 30. In one aspect of the present disclosure, the base end 56 is integral with the first axial end portion 36.

The free end 58 includes a tab 60 that projects radially inward toward the central longitudinal axis 44 of the fitting assembly 24. The tab 60 includes a tapered surface 62 that tapers inwardly with respect to the insertion direction 50. The tab 60 further includes a lip 64 that faces toward the second axial end portion 38.

The first axial end portion 36 of the body 30 defines an annular channel 66 disposed in the thru-bore 46. The annular channel 66 opens toward the first axial end portion 36.

The body 30 includes a collar 68 disposed between the first and second axial end portions 36, 38. The collar 68 extends outward in a radial direction from an outer surface 70 of the body 30. In one aspect of the present disclosure, the collar 68 is hexagonal in shape.

The outer surface 70 of the body 30 includes a first plurality of external threads 72 disposed at the first axial end portion 36 and a second plurality of external threads 74 disposed at the second axial end portion 38. In one aspect of the present disclosure, the first plurality of external threads 72 extends from the collar 68 to the base end 56 of the plurality of resilient projections 52 while the second plurality of external threads 74 extends from the collar 68 to the second end surface 42.

Referring now to FIG. 6, the cap member 32 is shown. The cap member 32 is adapted for engagement with the first axial end portion 36 of the body 30. The cap member 32 includes a first end 80 and an oppositely disposed second end 82 and defines an inner bore 84 that extends through the first and second ends 80, 82.

The inner bore 84 is adapted to receive the fiber optic cable 12. The inner bore 84 includes a plurality of internal threads 86 disposed at the first end 80. The plurality of internal threads 86 is adapted to engage the first plurality of external threads 72 on the first axial end portion 36 of the body 30.

In one aspect of the present disclosure, an inner diameter of the inner bore 84 at the first end 80 is greater than an inner diameter of the inner bore 84 at the second end 82. This difference between the inner diameters of the first and second ends 80, 82 of the inner bore 84 forms a shoulder 88 in the inner bore 84 near the second end 82 of the cap member 32. In one aspect of the present disclosure, the shoulder 88 includes an inclined surface 90 that tapers outwardly in the insertion direction. The inclined surface 90 of the shoulder 88 is adapted for engagement with the free ends 58 of the plurality of resilient projections 52 of the body 30. As will be described in greater detail subsequently, as the inclined surface 90 of the shoulder 88 engages the free ends 58 of the plurality of resilient projections 52 of the body 30, the free ends 58 flex inwardly toward the central longitudinal axis 44 of the fitting assembly 24.

Referring now to FIG. 4, the retainer member 34 is shown. The retainer member 34 defines a hole 92 that extends through the retainer member 34 in an axial direction. The hole 92 includes a plurality of internal threads 94. The plurality of internal threads 94 is adapted for engagement with the second plurality of external threads 74 of the second axial end portion 38 of the body 30.

Figure 8:
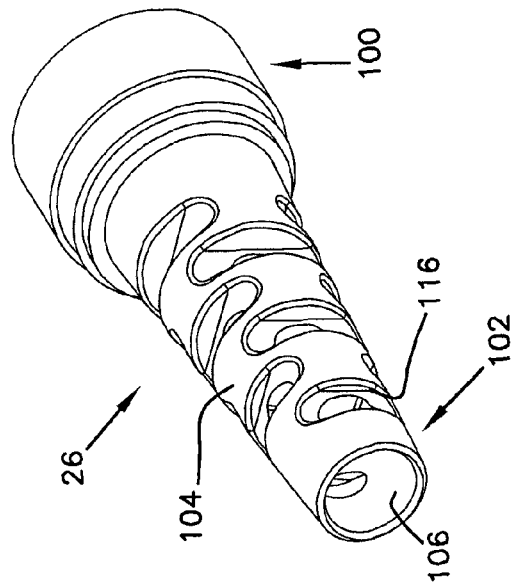
FIG. 8 is a rear perspective view of the seal member of FIG. 7.
Figure 9:
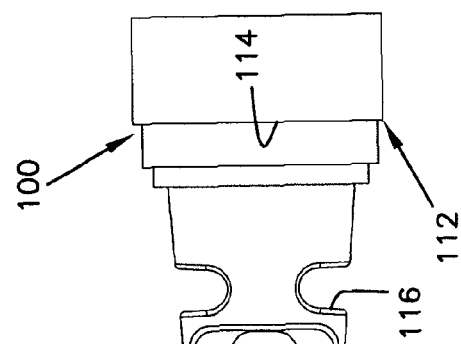
FIG. 9 is a side view of the seal member of FIG. 7.
Figure 7:
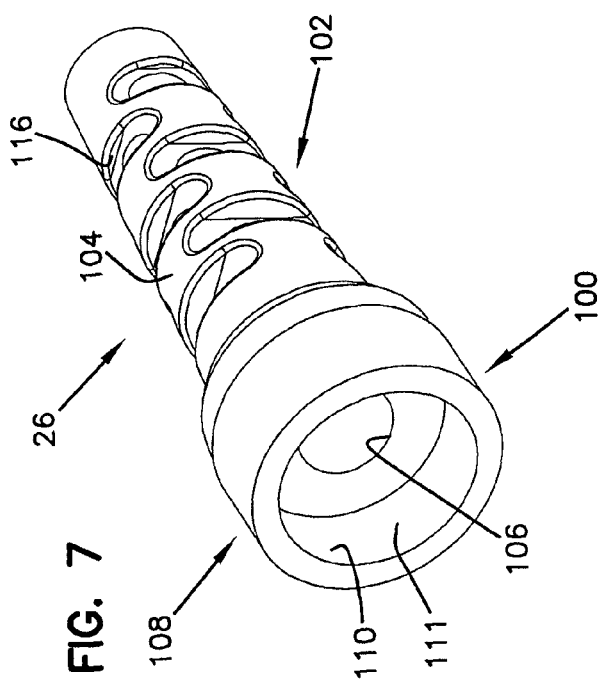
FIG. 7 is a perspective view of a seal member suitable for use with the cable pass-thru assembly of FIG. 1.

Referring now to FIGS. 7-9, the seal member 26 is shown. The seal member 26 includes a first end 100, an oppositely disposed second end 102 and an exterior surface 104. The seal member 26 defines a bore 106 that extends through the first and second ends 100, 102. The bore 106 is adapted to receive a fiber optic cable 12.

The first end 100 of the seal member 26 includes an annular wall 108. The annular wall 108 is generally cylindrical in shape. At least a portion of the annular wall 108 is adapted for receipt in the annular channel 66 of the thru-bore 46 of the first axial end portion 36 of the body 30. The annular wall 106 includes an interior surface 110 that defines a counter bore 111.

The exterior surface 104 of the first end 100 includes a rim portion 112. The rim portion 112 includes a rim surface 114 that faces in a direction toward the second end 102 of the seal member 26. The rim surface 114 is adapted for abutment with the lips 64 of the tabs 60 of the free ends 58 of the plurality of resilient projections 52 of the body 30, when the annular wall 108 is disposed in the annular channel 66 of the body 30. With the annular wall 108 disposed in the annular channel 66 of the body 30, the seal member 26 is axially captured between the annular channel 66 of the body 30 and the lips 64 of the plurality of resilient projections 52.

The exterior surface 104 of the second end 102 of the seal member 26 tapers inwardly as the exterior surface 104 extends from the first end 100 to the second end 102. The exterior surface 104 of the second end 102 includes a plurality of recesses 116 that are adapted to allow the second end 102 of the seal member 26 to flex without damaging the fiber optic cable 12.

Figure 10:
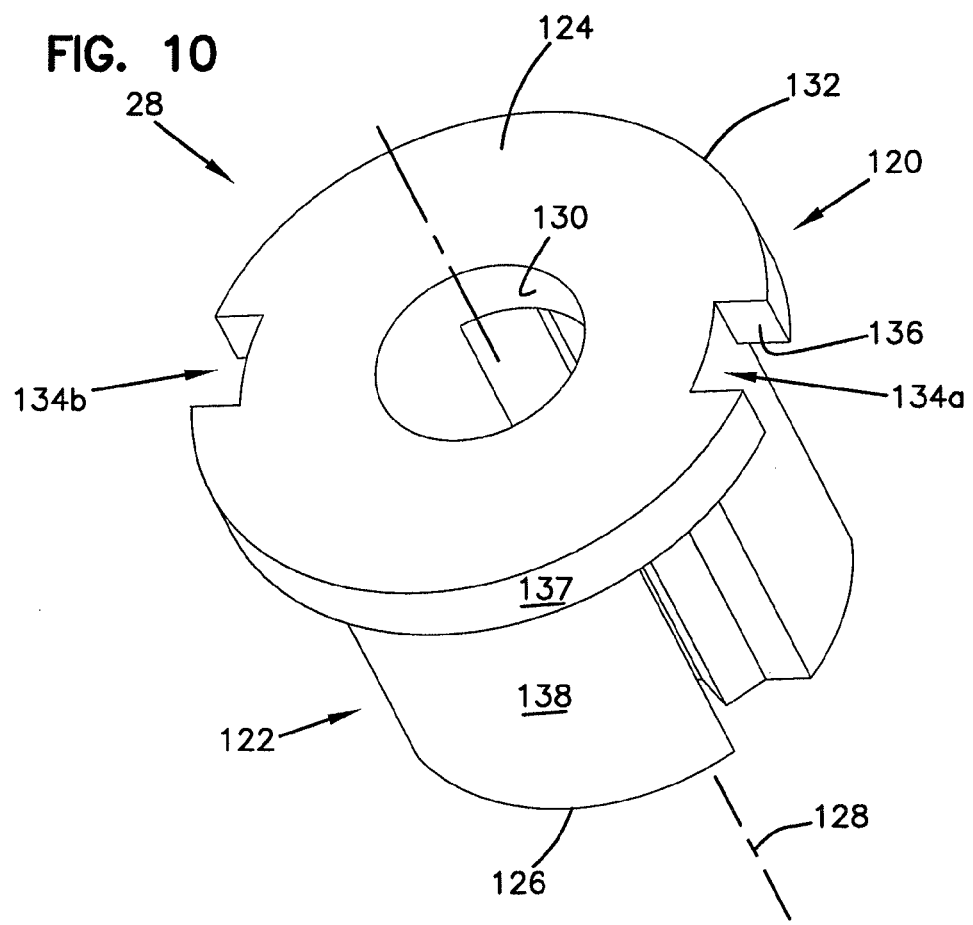
FIG. 10 is a perspective view of a cable retention member suitable for use with the cable pass-thru assembly of FIG. 1.
Figure 11:
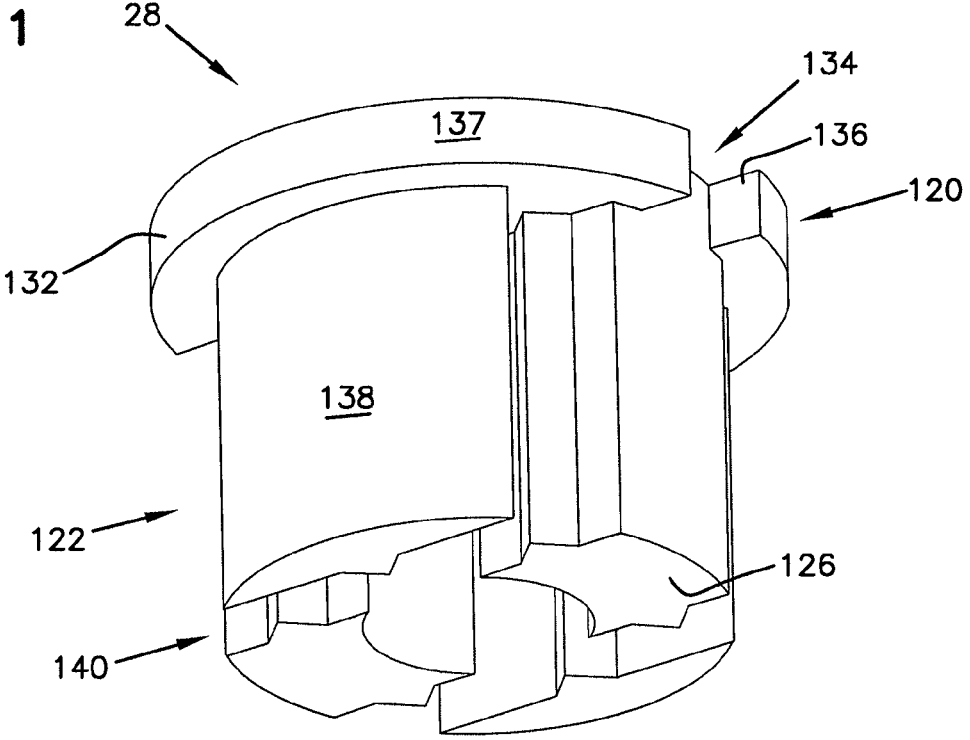
FIG. 11 is an alternate perspective view of the cable retention member of FIG. 10.
Figure 12:
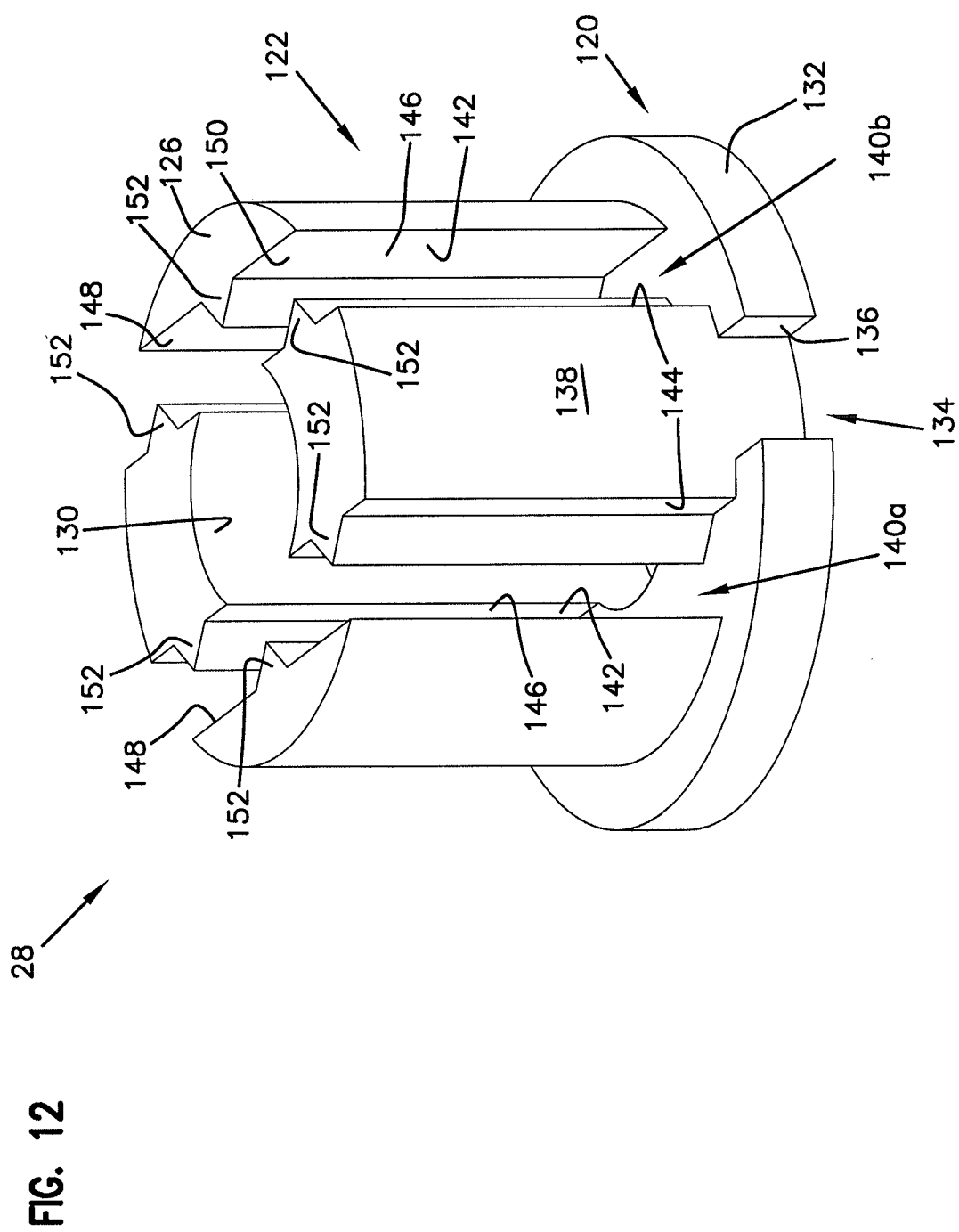
FIG. 12 is a perspective view of a second end portion of the cable retention member of FIG. 10.

Referring now to FIGS. 10-12, the cable retention member 28 is shown. The cable retention member 28 is generally cylindrical in shape. The cable retention member 28 includes a first end portion 120 and an oppositely disposed second end portion 122. The first end portion 120 includes a first end face 124 while the second end portion 122 includes a second end face 126. In one aspect of the present disclosure, the first and second end faces 124, 126 are generally perpendicular to a longitudinal axis 128 that extends through the center of the first and second end portions 120, 122.

The cable retention member 28 defines a bore 130 that extends through the first and second end portions 120, 122 and that is aligned with the longitudinal axis 128. The bore 130 is adapted to receive the fiber optic cable 12.

The first end portion 120 defines includes a flange 132 that extends outwardly in a radial direction from the central longitudinal axis 44. The flange 132 defines a plurality of slots 134 having openings 136 in a perimeter 137 of the flange 132. In one aspect of the present disclosure, the flange 132 defines a first slot 134a and an oppositely disposed second slot 134b.

The second end portion 122 extends outwardly in an axial direction from the first end portion 120 along the longitudinal axis 128. The second end portion 122 is adapted for insertion into the tapered portion 48 of the thru-bore 46 of the second axial end portion 38 of the body 30. The second end portion 122 includes an outer surface 138 that extends from the second end face 126 of the second end portion 122 to the flange 132 of the first end portion 120.

The second end portion 122 defines a plurality of grooves 140. In one aspect of the present disclosure, the second end portion 122 defines a first groove 140a and a second groove 140b. The first and second grooves 140a, 140b extend across the second end portion 122 in a direction that is generally perpendicular to the longitudinal axis 128 such that the first and second grooves 140a, 140b form geometric chords on the second end face 126 of the second end portion 122. In one aspect of the present disclosure, the first and second grooves 140a, 140b are offset from the longitudinal axis 128. In another aspect of the present disclosure, the first and second grooves 140a, 140b intersect the bore 130.

Each of the first and second grooves 140a, 140b includes a first sidewall 142, an oppositely disposed second sidewall 144, a first side opening 146 in the outer surface 138 of the second end portion 122, a second side opening 148 in the outer surface 138, and a third opening 150 in the second end face 126 of the second end portion 122. In one aspect of the present disclosure, each of the first and second grooves 140a, 140b extends from the third opening 150 to the first end portion 120.

Each of the first and second grooves 140a, 140b includes a plurality of retention projections 152. In one aspect of the present disclosure, the retention projections 152 are disposed on the first and second sidewalls 142, 144 of the first and second grooves 140a, 140b. The retention projections 152 project into the first and second grooves 140a, 140b from the first and second sidewalls 142, 144. In one aspect of the present disclosure, each of the retention projections 152 tapers inwardly to a retention edge as the retention projections 152 project into the first and second grooves 140a, 140b.

Figure 13:
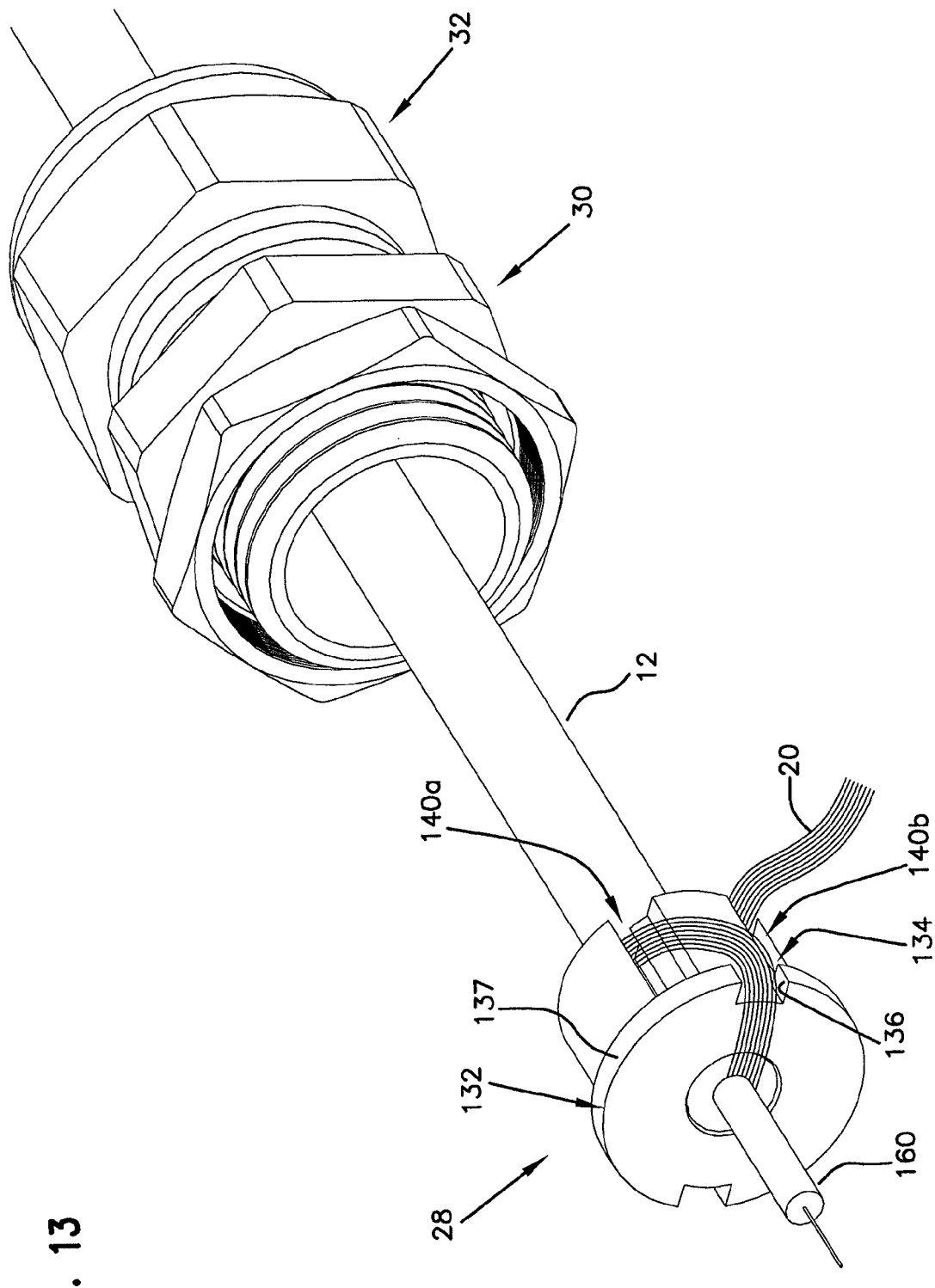
FIG. 13 is a perspective view of an exemplary routing scheme for routing a strength member of a fiber optic cable through the cable retention member of FIG. 10.
Figure 14:
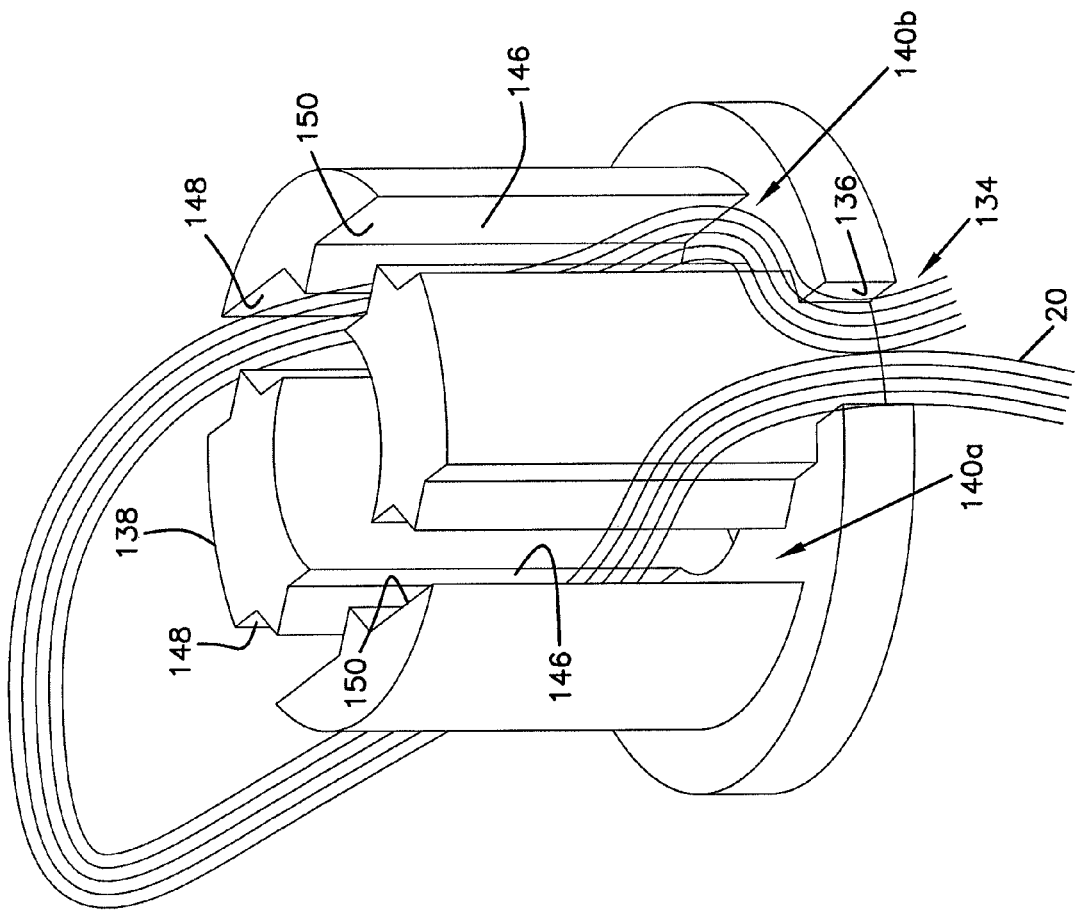
FIG. 14 is a perspective view of an exemplary routing scheme for routing a strength member of a fiber optic cable through the second end portion of the cable retention member of FIG. 10.

Referring now to FIGS. 13 and 14, the assembly of the cable pass-thru assembly 10 will be described. An end 160 of the fiber optic cable 12 is passed through the inner bore 84 of the cap member 32, the bore 106 of the seal member 26, the thru-bore 46 of the body 30, and the bore 130 of the cable retention member 28. A portion of the annular wall 106 of the first end 100 of the seal member 26 is inserted into the annular channel 66 of the thru-bore 46 of the first axial end portion 40 of the body 30 such that the annular wall 106 is axially captured between the annular channel 66 and the lip 64 of the plurality of resilient projections 52.

With the fiber optic cable 12 disposed in the bore 130 of the cable retention member 28, the strength member 20 of the fiber optic cable 12 is routed through one of the openings 136 of the slots 134 in the perimeter 137 of the flange 132 of the cable retention member 28. The strength member 20 is inserted into the first groove 140a through the first side opening 146 and the third opening 150 in the second end portion 122 of the cable retention member 28. The strength member 20 exits the first groove 140a through the second side opening 148 and is routed across a portion of the outer surface 138 between the first and second grooves 140a, 140b. The strength member 20 is then routed into the second groove 140b through the second side opening 148 and the third opening 152 of the second groove 140b. The strength member 20 exits the second groove 140a through the first side opening 148.

With the strength member 20 routed through the first and second grooves 140a, 140b, the cable retention member 28 is inserted into the tapered portion 48 of the second axial end portion 38 of the body 30 in a direction opposite the cable insertion direction 50. As the cable retention member 28 is pressed into the tapered portion 48 of the second axial end portion 38, the outer surface 138 of the second end portion 122 contacts the tapered portion 48. As the second end portion 102 of the cable retention member 28 is pressed into the tapered portion 48 of the body 30, the contact between the outer surface 138 of the second end portion 122 and the tapered portion 48 of the body 30 causes the second end portion 122 to flex inward toward the longitudinal axis 128 of the cable retention member 28. As the second end portion 122 flexes inward, the width of each of the first and second grooves 140a, 140b decreases. As the width decreases, the retention projections 152 are pressed against the strength member 20 disposed in the first and second grooves 140a, 140b.

The second end portion 122 of the cable retention member 28 is inserted into the tapered portion 48 of the body 30 until the flange 132 abuts the second end surface 42 of the second axial end portion 38 of the body 30. In one aspect of the present disclosure, the portion of the strength member 20 that is routed across the outer surface 138 of the cable retention member 28 between the first and second grooves 140a, 140b is compressed between the flange 132 of the cable retention member 28 and the second end surface 42 of the second axial end portion 38 of the body 30.

With the cable retention member 28 disposed in the body 30, the cap member 32 is engaged to the first end portion 36 of the body 30. As the cap member 32 is tightened, the inclined surface 90 of the shoulder 88 engages the free ends 58 of the plurality of resilient projections 52 of the body 30. As the cap member 32 is advanced onto the first end portion 36 of the body 30, the free ends 58 of the plurality of resilient projections 52 flex inwardly toward the central longitudinal axis 44 of the cable pass-thru fitting 14. As the plurality of projections 52 flex inwardly, the free ends 58 compress the annular wall 106 of the seal member 26 around the fiber optic cable 12 to seal the interface between the fiber optic cable 12 and the seal member 26.

The fiber optic cable 12 is axially retained in the cable pass-thru fitting 14 by the engagement between the strength member 20, the cable retention member 28 and the body 30. With the strength member 20 disposed in the first and second grooves 140a, 140b of the cable retention member 28, a pull-out force applied to the fiber optic cable 12 in a direction opposite the cable insertion direction 50 is transferred to the cable pass-thru fitting 14 through the engagement between the strength member 20, the cable retention member 28 and the body 30. This force transfer prevents the pull-out force from acting directly on the optical fiber 16 of the fiber optic cable and potentially damaging the optical fiber 16.

In one aspect of the present disclosure, the fiber optic cable 12 is at least partially retained in the cable pass-thru fitting 14 by the disposition of the strength member 20 of the fiber optic cable in the first and second grooves 140a, 140b. As the first and second grooves 140a, 140b compress during assembly into the body 30, the friction between the first and second grooves 140a, 140b and the strength member 20 transfers the pull-out force applied to the fiber optic cable 12 to the cable pass-through fitting 14.

In another aspect of the present disclosure, the fiber optic cable 12 is at least partially retained in the cable pass-thru fitting 14 by the disposition of the strength member 20 between the flange 132 of the cable retention member 28 and the second end face 42 of the body 30. The friction between the strength member 20 and the flange 132 and second end face 42 transfers the pull-out force applied to the fiber optic cable 12 to the cable pass-through fitting 14.

Figure 15:
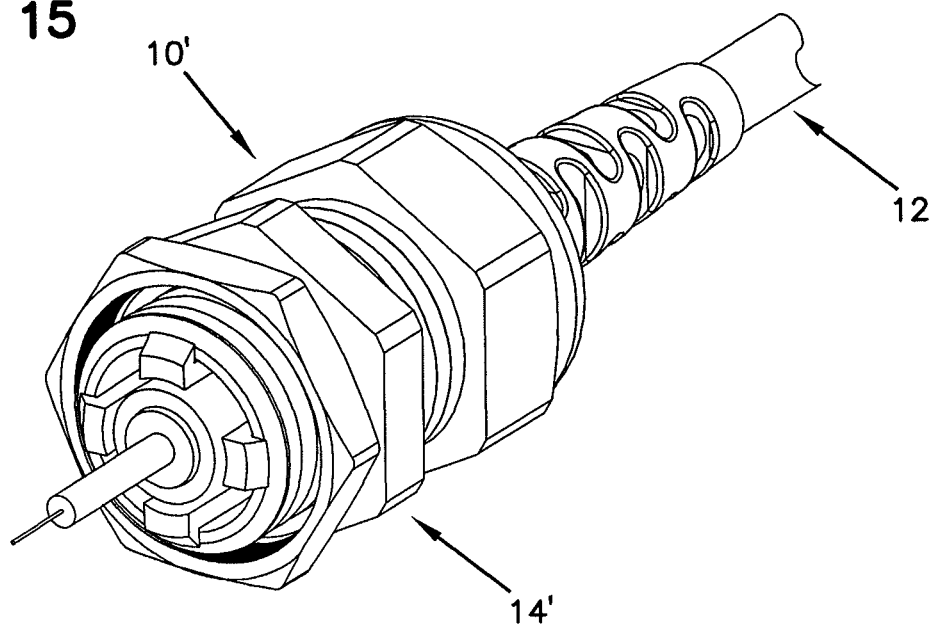
FIG. 15 is a perspective view of an alternate embodiment of a cable pass-thru assembly.
Figure 16:
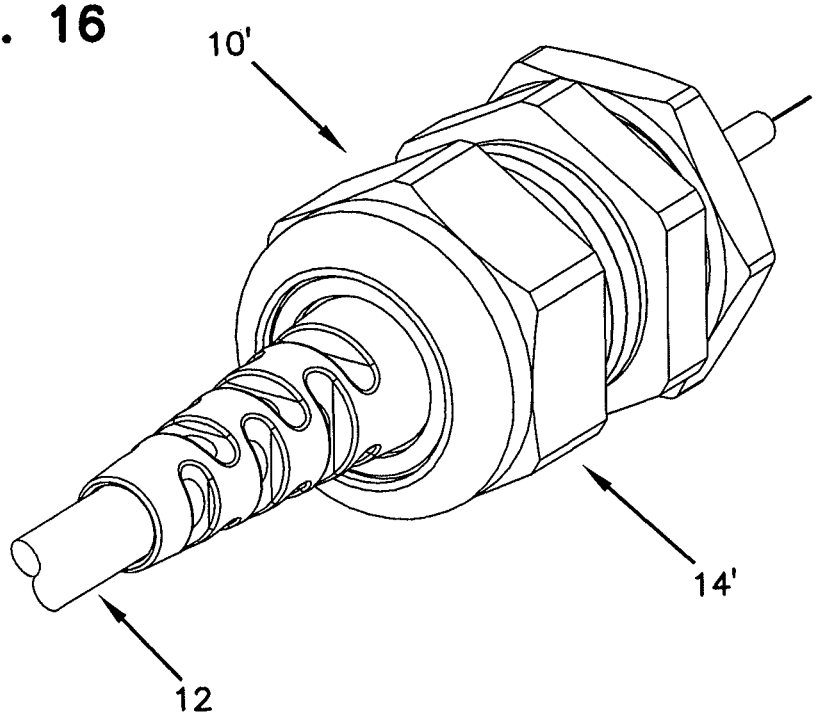
FIG. 16 is a rear perspective view of the cable pass-thru assembly of FIG. 15.
Figure 17:
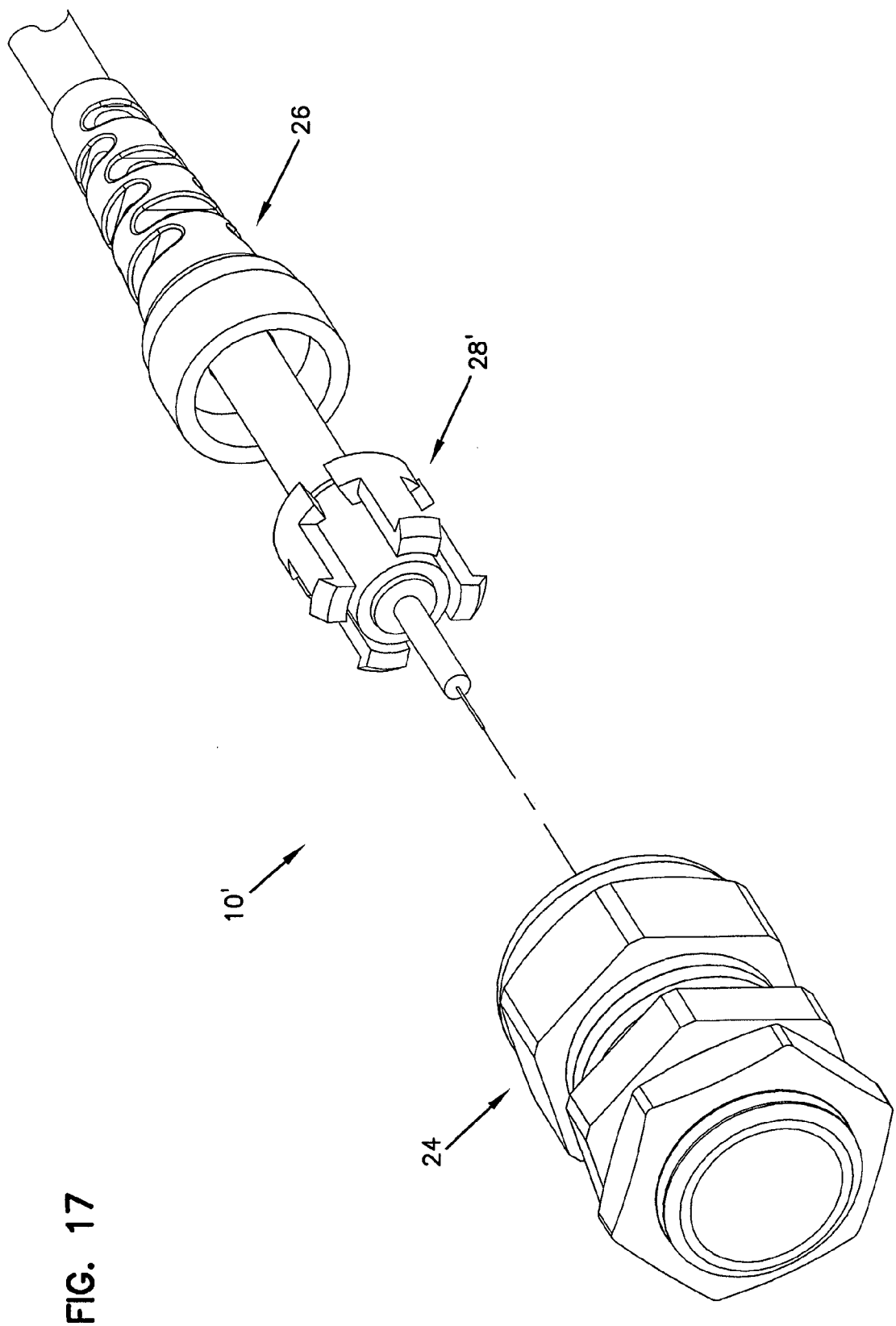
FIG. 17 is an exploded perspective view of the cable pass-thru assembly of FIG. 15.

Referring now to FIGS. 15-17, an alternate embodiment of a cable pass-thru assembly 10' is shown. The cable pass-thru assembly 10' includes the fiber optic cable 12 and an alternate embodiment of the cable pass-thru fitting 14'. The cable pass-thru fitting 14' includes the fitting assembly 24, the seal member 26, and an alternate embodiment of a cable retention member 28'.

Figure 18:
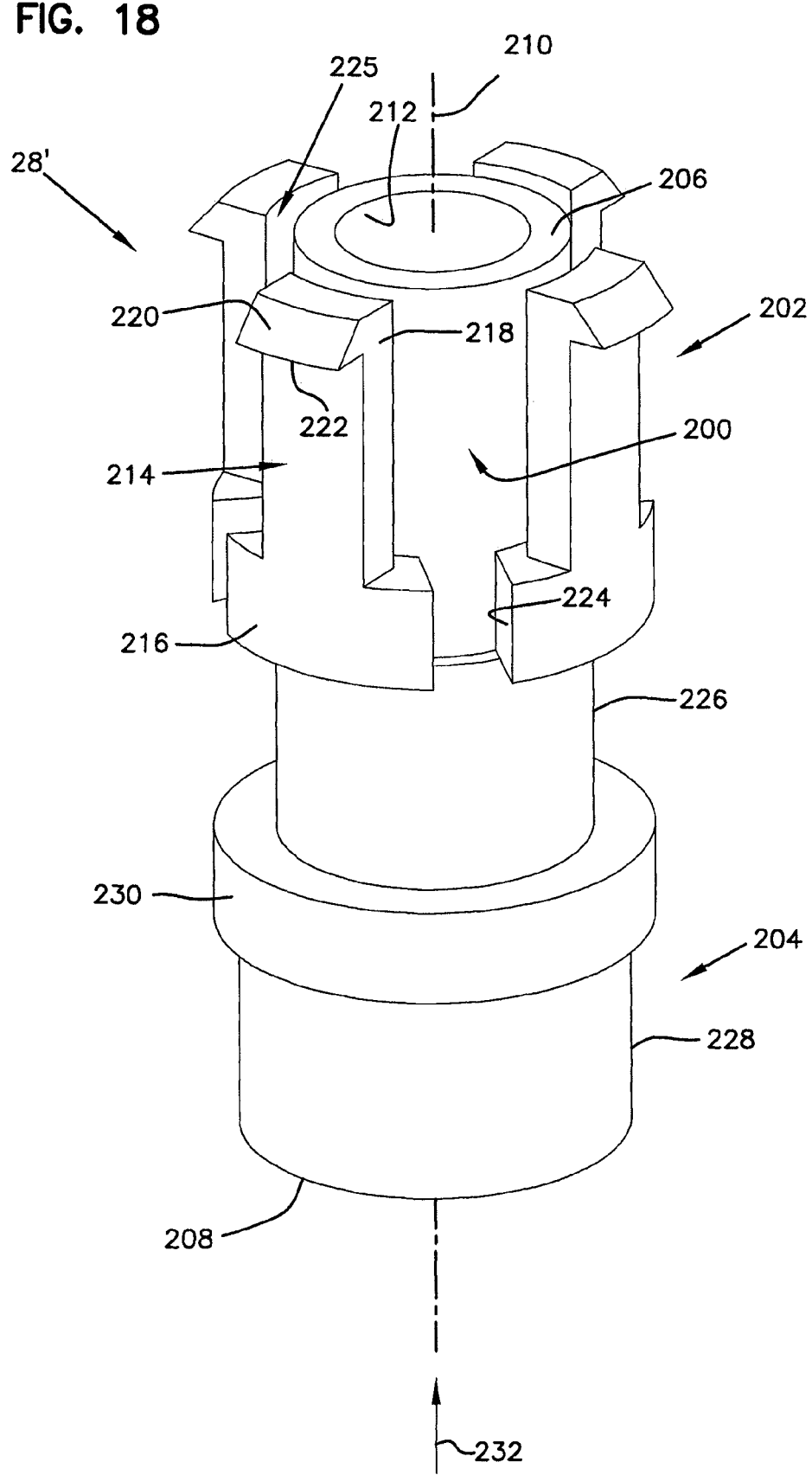
FIG. 18 is a perspective view of an alternate embodiment of a cable retention member suitable for use with the cable pass-thru assembly of FIG. 15.
Figure 19:
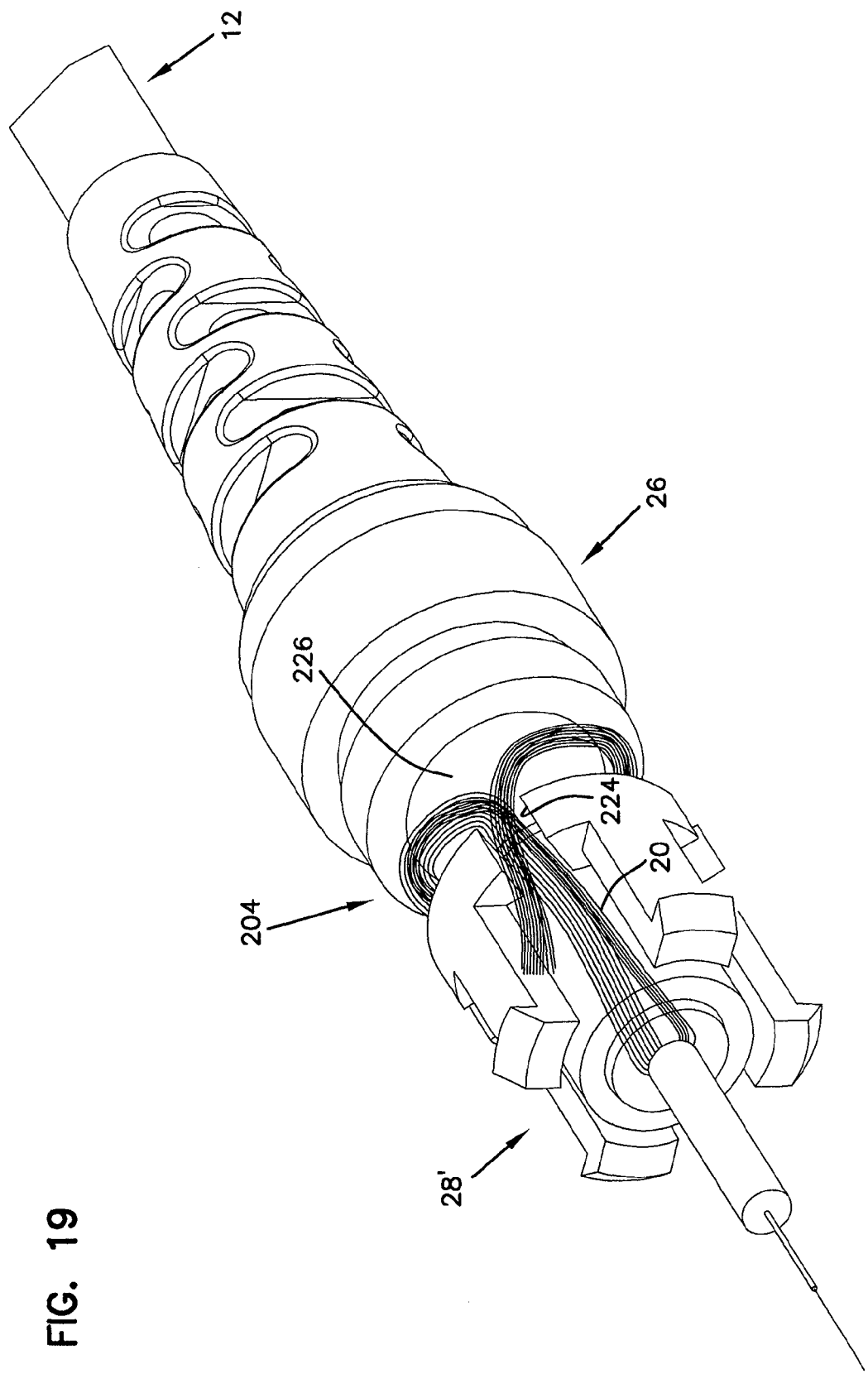
FIG. 19 is a perspective view of an exemplary routing scheme for routing a strength member of a fiber optic cable through the cable retention member of FIG. 15.

Referring now to FIG. 18, the cable retention member 28' is shown. The cable retention member 28' includes a body portion 200 having a first end portion 202 and an oppositely disposed second end portion 204. The body portion 200 includes a first end face 206 disposed at the first end portion 202 and a second end face 208 disposed at the second end portion 204. In one aspect of the present disclosure, the first and second end faces 206, 208 are generally perpendicular to a longitudinal axis 210 that extends through the center of the first and second end portions 202, 204.

The cable retention member 28' defines a bore 212 that extends through the first and second end portions 202, 204. The bore 212 is aligned with the longitudinal axis 210 and is adapted to receive the fiber optic cable 12.

The first end portion 202 includes a plurality of resilient protrusions 214. The plurality of resilient protrusions 214 is disposed about the longitudinal axis 210. In one aspect of the present disclosure, there are four resilient protrusions 214.

Each of the plurality of resilient protrusions 214 includes a base end 216 and an oppositely disposed free end 218. The base end 216 is engaged with the first end portion 202 of the body portion 200. The free end 218 extends outwardly from the base end 216 in a direction that is generally parallel with the longitudinal axis 210.

Each of the free ends 218 of the plurality of resilient protrusions 214 includes a tab 220. The tab 220 extends outwardly from the free end 218 in a direction that is radially outward from the longitudinal axis 210. The tab 220 includes a lip 222 that is adapted for abutment with the second end surface 42 of the second axial end portion 38 of the body 30.

The base ends 216 of the plurality of resilient protrusions 214 define a plurality of pass-thru slots 224. The plurality of pass-thru slots 224 is disposed between adjacent resilient protrusions 214. In one aspect of the present disclosure, there are four pass-thru slots 224, with one pass-thru slot 224 disposed between adjacent resilient protrusions 214.

The plurality of resilient protrusions 214 and the first end portion 202 of the body portion 200 cooperate to define an annular space 225. The annular space 225 is disposed between the free ends 218 of the plurality of resilient protrusions 214 and the first end portion 202 of the body portion 200. The annular space 225 allows the resilient protrusions 214 to flex inwardly toward the longitudinal axis 210 as the cable retention member 28' is inserted into the body 30.

The second end portion 204 of the body portion 200 includes an inner portion 226, an outer portion 228 and a collar 230 disposed between the inner and outer portions 226, 228. In one aspect of the present disclosure, the inner portion 226 has an outer diameter that is slightly smaller than an outer diameter of the outer portion 228. In one aspect of the present disclosure, at least a portion of the outer portion 228 is adapted for receipt in the counter bore 111 of the seal member 26.

Referring now to FIGS. 5, 6 and 17-19, the insertion of the fiber optic cable 12 into the cable retention member 28' will be described. The fiber optic cable 12 is inserted through the bore 212 of the cable retention member 28' in a cable insertion direction 232 (shown as an arrow in FIG. 18). The strength member 20 of the fiber optic cable 12 is routed through a first pass-thru slot 224 in a direction opposite the cable insertion direction 232. The strength member 20 is then wrapped around the inner portion 226 of the second end portion 204 of the cable retention member 28'. The strength member is then directed through a second pass-thru slot 224 in the cable insertion direction 230. In one aspect of the present disclosure, the first and second pass-thru slots 224 are the same pass-thru slot 224.

With the strength member 20 disposed around the inner portion 226 of the second end portion 204 of the cable retention member 28', the cable retention member 28' is inserted into the body 30. As the cable retention member 28' is inserted into the body 30, the strength member 20 is compressed between the tapered portion 48 of the thru-bore 46 of the second end portion 38 and the inner portion 226 of the cable retention member 28'.

In an alternate embodiment, the strength member 20 is further wrapped around the first end portion 202 of the body portion 200 such that the strength member 20 is disposed in the annular space 225. As the cable retention member 28' is inserted in the body 30, the strength member 20 is compressed between the tapered portion 48 of the body 30 and the inner portion 226 of the cable retention member 28' as well as between the free ends 218 of the plurality of resilient projections 214 and the first end portion 202 of the body portion 200.

The fiber optic cable 12 is axially retained in the cable pass-thru fitting 14 by the engagement between the strength member 20, the cable retention member 28' and the body 30. With the strength member 20 wrapped around the inner portion 226 of the cable retention member 28', a pull-out force applied to the fiber optic cable 12 in a direction opposite the cable insertion direction 230 is transferred to the cable pass-thru fitting 14 through the engagement between the strength member 20, the cable retention member 28' and the body 30. This force transfer prevents the pull-out force from acting directly on the optical fiber 16 of the fiber optic cable and potentially damaging the optical fiber 16.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A cable pass-thru assembly comprising:
   a fiber optic cable having an optical fiber and a strength member;
   a cable pass-thru fitting adapted to receive at least a portion of the fiber optic cable, the cable pass-thru fitting including:
   a fitting assembly having a body defining a thru-bore that extends through the body, the body including a first axial end portion and an oppositely disposed second axial end portion, the first axial end portion of the body including a plurality of resilient projections extending in an axial direction, each of the plurality of resilient projections including a base end and an oppositely disposed free end, the base end being engaged with the first axial end portion of the body, the thru-bore including a tapered portion;
   a cable retention member adapted for engagement with the tapered portion of the body, the cable retention member includes:
   a first end portion;
   a second end portion opposite the first end portion, the cable retention member defining a bore that extends through the first and second end portions,
   a flange disposed at the first end portion that extends outwardly in a radial direction from a central longitudinal axis of the cable retention member, the flange defining first and second notches in a perimeter of the flange;
   the second end portion including at least four legs extending from the flange along the central longitudinal axis, wherein each of the at least four legs have a free end opposite the flange;
   the at least four legs of the cable retention member defining a plurality of grooves extending in a direction along the central longitudinal axis from the flange to the free end of the at least four legs, the plurality of grooves forming geometric chords at the free end, wherein the plurality of grooves are generally parallel to the at least four legs and offset from the first and second notches, wherein the strength member of the fiber optic cable is routed through the plurality of grooves, the grooves being adapted to secure the strength member when the cable retention member is inserted into the thru-bore.

2. The cable pass-thru assembly of claim 1, wherein each groove includes a retention projection that projects into the groove.

3. The cable pass-thru assembly of claim 2, wherein the retention projection tapers inwardly to a retention edge as the retention projection projects into the groove.

4. The cable pass-thru assembly of claim 2, wherein each groove includes a plurality of retention projections that projects into the groove.

5. The cable pass-thru assembly of claim 2, wherein the retention projection is disposed on sidewalls of the plurality of grooves.

6. The cable pass-thru assembly of claim 1, wherein the second notch is oppositely disposed from the first notch.

7. The cable pass-thru assembly of claim 1, wherein the strength member is selected from a group consisting of yarns, fibers, threads, tapes, films, and filaments.

8. The cable pass-thru assembly of claim 1, further comprising a sealing member that provides a seal about the fiber optic cable.

9. The cable pass-thru assembly of claim 1, wherein the first end portion includes a first end face while the second end portion includes a second end face such that the first and second end faces are generally perpendicular to the central longitudinal axis that extends through a center of the first and second end portions.

10. The cable pass-thru assembly of claim 9, wherein the second end portion includes an outer surface that extends from the second end face of the second end portion to the flange of the first end portion.

11. The cable pass-thru assembly of claim 1, wherein the cable retention member is generally cylindrical in shape.

12. The cable pass-thru assembly of claim 1, wherein the plurality of grooves intersect the bore of the cable retention member.

* * * * *